United States Patent [19]

Morikane

[11] Patent Number: 5,070,270
[45] Date of Patent: Dec. 3, 1991

[54] BRUSH DEVICE

[75] Inventor: Hiroyuki Morikane, Hyogo, Japan

[73] Assignee: Mitsubishi Denki K.K., Tokyo, Japan

[21] Appl. No.: 294,638

[22] PCT Filed: Mar. 1, 1988

[86] PCT No.: PCT/JP88/00229

§ 371 Date: Oct. 26, 1988

§ 102(e) Date: Oct. 26, 1988

[87] PCT Pub. No.: WO88/06815

PCT Pub. Date: Sep. 7, 1988

[30] Foreign Application Priority Data

Mar. 4, 1987 [JP] Japan .................................. 62-31317

[51] Int. Cl.⁵ ............................................ H02K 13/00
[52] U.S. Cl. ...................................... 310/239; 310/43;
310/45; 310/91
[58] Field of Search ............... 310/238, 239, 242, 244,
310/245, 247, 248, 249, 241, 43, 45, 91, 233, 88, 89

[56] References Cited

U.S. PATENT DOCUMENTS

| 4,166,968 | 9/1979 | Prittie | 310/239 |
| 4,355,253 | 10/1982 | Vollbrecht | 310/239 |
| 4,366,404 | 12/1982 | Ziegler | 310/239 |
| 4,754,184 | 6/1988 | Morikane et al. | |

FOREIGN PATENT DOCUMENTS

| 0136503 | 4/1985 | European Pat. Off. | 310/239 |
| 3022991 | 1/1982 | Fed. Rep. of Germany | 310/242 |
| 3031915 | 4/1982 | Fed. Rep. of Germany | 310/238 |
| 3408023 | 9/1984 | Fed. Rep. of Germany | |
| 0139105 | 12/1978 | Japan | 310/239 |
| 0023774 | 2/1980 | Japan | 310/242 |
| 0110053 | 7/1982 | Japan | |
| 166263 | 5/1983 | Japan | |
| 0179145 | 10/1983 | Japan | 310/238 |
| 0132747 | 7/1984 | Japan | |
| 0216438 | 12/1984 | Japan | |
| 181156 | 12/1985 | Japan | |
| 129261 | 8/1987 | Japan | |

Primary Examiner—R. Skudy
Attorney, Agent, or Firm—Sughrue, Mion, Zinn, Macpeak & Seas

[57] ABSTRACT

In the present invention, a receiving portion for receiving therein and holding a brush and a brush spring which is for urging the brush toward a commutator, and an opening for drawing out a lead wire fixed to the brush, are formed in a brush holding frame, and an end portion on the commutator side of the said opening is inclined inwards of the said receiving portion and in the commutator urging direction. Consequently, the lead wire does not obstruct the advance of the brush toward the commutator based on wear, thus permitting effective use of the brush, and improving economy and durability.

3 Claims, 2 Drawing Sheets

BRUSH DEVICE

FIELD OF THE INVENTION

The present invention relates to a brush device for use in a rotary machine such as, for example, a starter motor.

FIGS. 1 and 2 are a plan view and a sectional view of a principal portion, respectively, showing at conventional brush device. In FIGS. 1 and 2, the numeral 1 denotes a commutator of a rotary machine; numerals 2a and 2b denote minus-side holding frames; numerals 3a and 3b denote plus-side holding frames; numerals 4a and 4b denote synthetic resin plates which are fixed to the plus-side holding frames 3a and 3b at caulking and fixing portions 5a and 5b, respectively; and numeral 6 denotes a base plate made of iron, which is fixed by caulking to the minus-side holding frames 2a and 2b directly and also to the plus-side holding frames 3a and 3b through the synthetic resin plates 4a and 4b in an insulated relation. Numerals 7a and 7b denote plus-side brushes received in a receiving space formed by the plus-side holding frames 3a, 3b and the synthetic resin plates 4a, 4b. Numerals 8a and 8b denote minus-side brushes received in a receiving space formed by the minus-side holding frames 2a, 2b and the base plate 6. On portions of brushes 7a, 7b, 8a, and 8b are fixed lead wires 9a, 9b, 10a, and 10b. The lead wires 9a and 9b, which are on the minus side, are connected electrically to the base plate 6, while the lead wires 10a and 10b, which are on the plus side, are connected electrically to a power unit through a connector 11. Further, numeral 12 denotes a brush spring for urging the brushes 7a, 7b, 8a and 8b to the commutator 1.

In the conventional brush device of the above construction, however, when the brushes 7a, 7b, 8a, and 8b are worn out by sliding contact with the commutator 1 and that wear exceeds a predetermined amount, the lead wires 9a, 9b, 10a, and 10b come into abutment with the holding frames 2a, 2b, 3a, and 3b, as shown in FIG. 2, resulting in the brushes 7a, 7b, 8a, and 8b no longer being employable although a portion of their rated service life still remains.

SUMMARY OF THE INVENTION

The present invention has been effected to solve the above-mentioned problem of the prior art. It is the object thereof to provide a brush device having a longer employable period and improved durability.

In the brush device according to the present invention, a brush and a spring for urging the brush to a commutator are enclosed in a brush holding frame, and in order to draw out a lead wire connected to the brush, an end portion in a commutator sliding-contact direction of an opening formed in the brush holding frame is inclined inwards of the receiving portion of the brush holding frame and in the commutator sliding-contact direction. This construction is advantageous in that the lead wire does not obstruct the advance of the brush when worn out, whereby the brush can be used effectively and both economy and durability can be attained.

DETAILED DESCRIPTION OF THE PRESENT INVENTION

Figure 1:
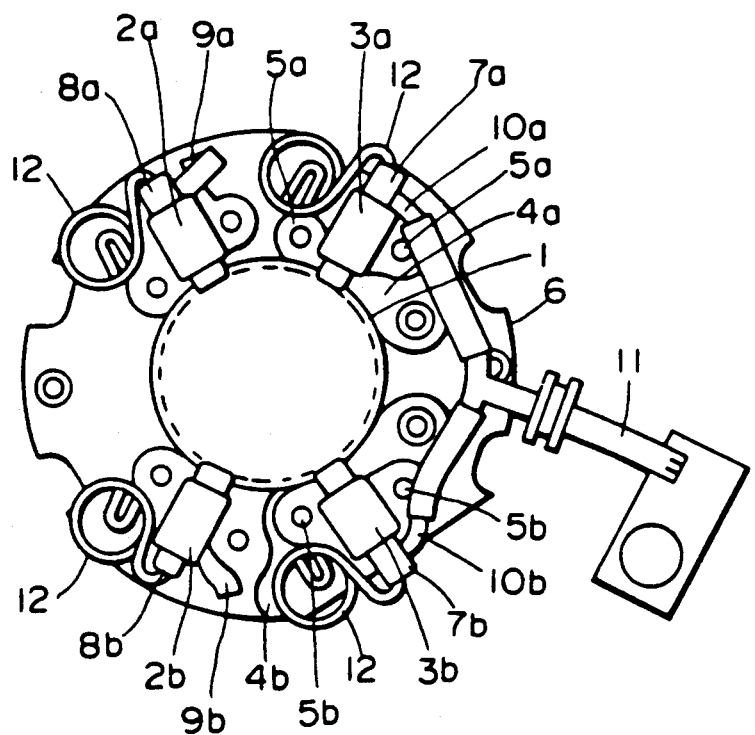
FIG. 1 is a plan view of a conventional brush device.
Figure 2:
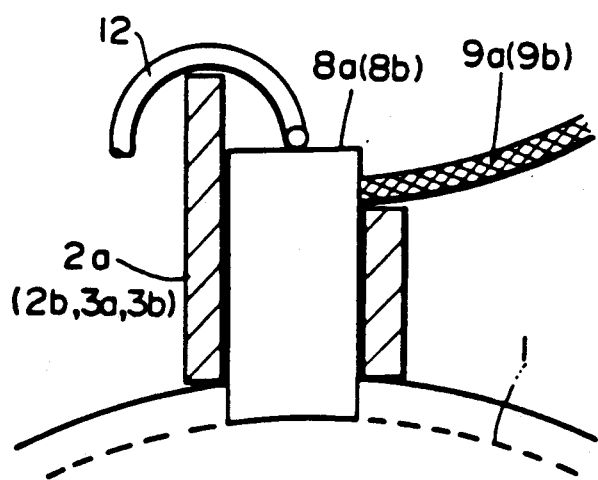
FIG. 2 is a sectional view of a principal portion thereof.
Figure 3:
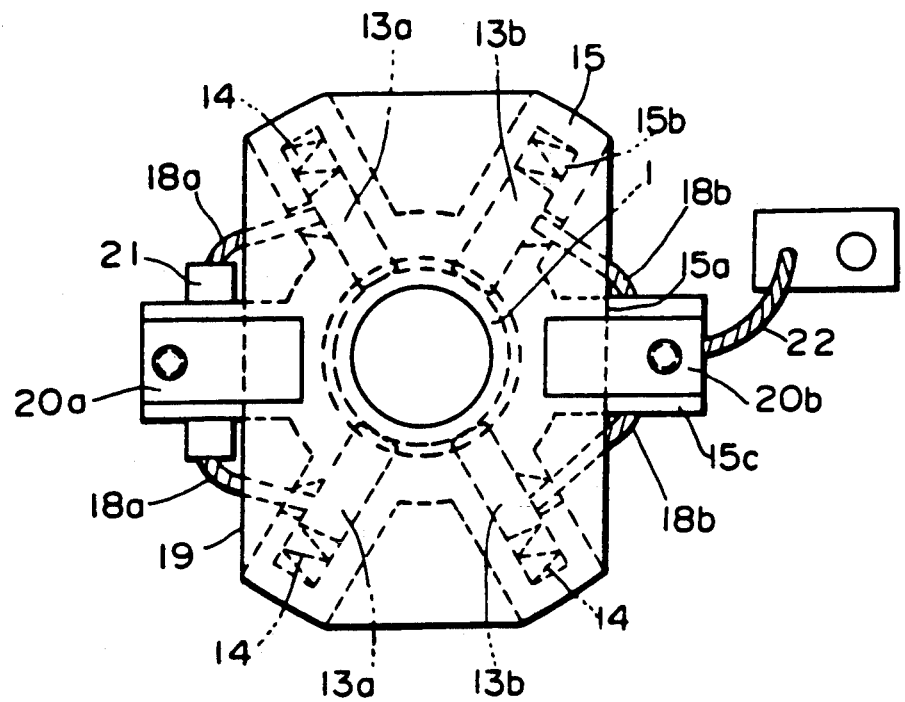
FIG. 3 is a plan view of a brush device according to an embodiment of the present invention.
Figure 4:
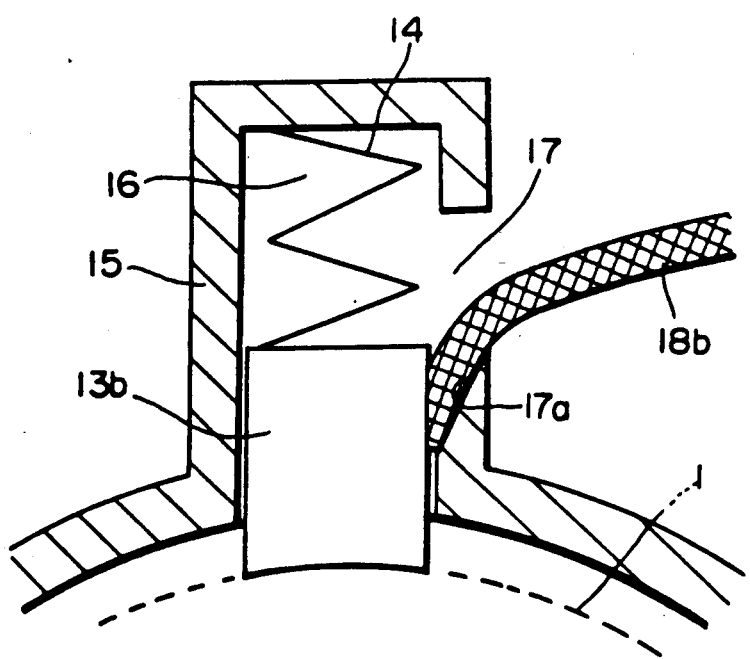
FIG. 4 is a sectional view of a principal portion thereof.

A brush device embodying the present invention will now be described with reference to the drawings. FIGS. 3 and 4 are a plan view and a sectional view of a principal portion, respectively, showing a brush device according to an embodiment of the invention. In FIGS. 3 and 4, numerals 13a and 13b denote minus and plus brushes, respectively, and numeral 14 denotes a brush spring for urging the brushes 13a and 13b to a commutator 1. The brushes 13a, 13b and brush spring 14 are received in a receiving portion 16 of a brush holding frame 15 integrally molded using a thermosetting synthetic resin. Numeral 17 denotes an opening sufficiently adequate for drawing out a lead wire 18a or 18b, and the opening is formed in a side part of the receiving portion 16 of the brush holding frame 15. An end portion of the opening 17 on the commutator 1 side (downward in FIG. 4) is provided with one incline facing inwards of the receiving portion 16 and in the commutator 1 urging direction to form inclined portion a single continuous 17a. Numeral 19 denotes an insulating plate for insulation of the brushes 13a, 13b and an end bracket (not shown). The insulating plate 19, engaged with an engaging portion 15a of the brush holding frame 15, covers the whole surface of an axial opening 15b of the brush holding frame 15. Numerals 20a and 20b each denote an internally threaded, mounting piece formed of iron, threadedly engaging with the-end bracket, fitted in an integrally formed projecting portion 15c of the brush holding frame 15, and bringing the insulating plate 19 into pressure contact with the brush holding frame 15 and positioning it. Numeral 21 denotes a projecting portion integral with the mounting piece 20a. The projecting portion 21 is welded to the lead wire 18a and the minus brush 13a is electrically connected to the end bracket through the lead wire 18a, projecting portion 21 and mounting piece 20a. Numeral 22 denotes a leader electrically connected to the lead wire 18b. The plus brush 13b is electrically connected to a battery (not shown) through the lead wire 18b and the leader 22. Although in FIG. 4 there is shown only the brush holding frame 15 on the plus brush 13b side, the brush holding frame 15 on the minus brush 13a side is also formed likewise.

In the brush device constructed as above, the brushes 13a, 13b and the brush spring 14 are housed in the receiving portion 16 of the brush holding frame 15. The lead wires 18a and 18b are drawn out from the opening 17 and the insulating plate 19 is brought into engagement with the engaging portion 15a while covering the brush holding frame opening 15b. Further, the mounting pieces 20a and 20b are fitted in the projecting portion 15c from the outside (in the transverse direction in FIG. 3), and the insulating plate 19 is brought into pressure contact with the brush holding frame 15 and positioned.

In such a device, the brushes 13a and 13b in sliding contact with the commutator 1 are worn out gradually with operation of the rotary machine. Consequently, with wear of the brushes 13a and 13b, the brushes 13a, 13b mounting portions of the lead wires 18a and 18b move toward the commutator 1. During long-term use, the mounting portions move inwards (toward the commutator 1) from an edge portion on the commutator 1 side of the opening 17, as shown in FIG. 4. However, since the end portion on the commutator 1 side of the opening 17 is formed as the inclined portion 17a, the lead wires 18a and 18b are curved along the inclined portion 17a, not obstructing the advance of the brushes 13a and 13b based on the urging force of the brush spring 14.

I claim:

1. In a brush device including a brush to which is fixed a lead wire and which is in sliding contact with a commutator of a rotary machine, a brush spring for urging said brush to said commutator in a direction of movement of said commutator, and a brush holding frame having a receiving portion for receiving therein and holding said brush and said brush spring, and also having an opening sufficiently adequate to permit drawing out only of said lead wire, the improvement characterized in that an end portion of said frame on a commutator side of said opening is provided with a single continuous incline inwards of said receiving portion and in said direction of movement of said commutator, wherein said brush holding frame comprises a unitary, integrally molded thermosetting synthetic resin, and wherein said brush device comprises mounting means, fitted in said brush holding frame, for mounting and positioning an insulating plate on said brush holding frame.

2. A brush device according to claim 1, wherein an axial opening of said brush holding frame is wholly covered with said insulating plate.

3. A brush device according to claim 2, wherein said mounting means comprises a mounting piece fitted into a projecting portion integral with said brush holding frame to bring said insulating plate into pressure contact with said brush holding frame and position said insulating plate.

* * * * *